F. W. BOWER.
TRAILER.
APPLICATION FILED FEB. 23, 1918.
1,314,498.
Patented Sept. 2, 1919.
3 SHEETS—SHEET 1.
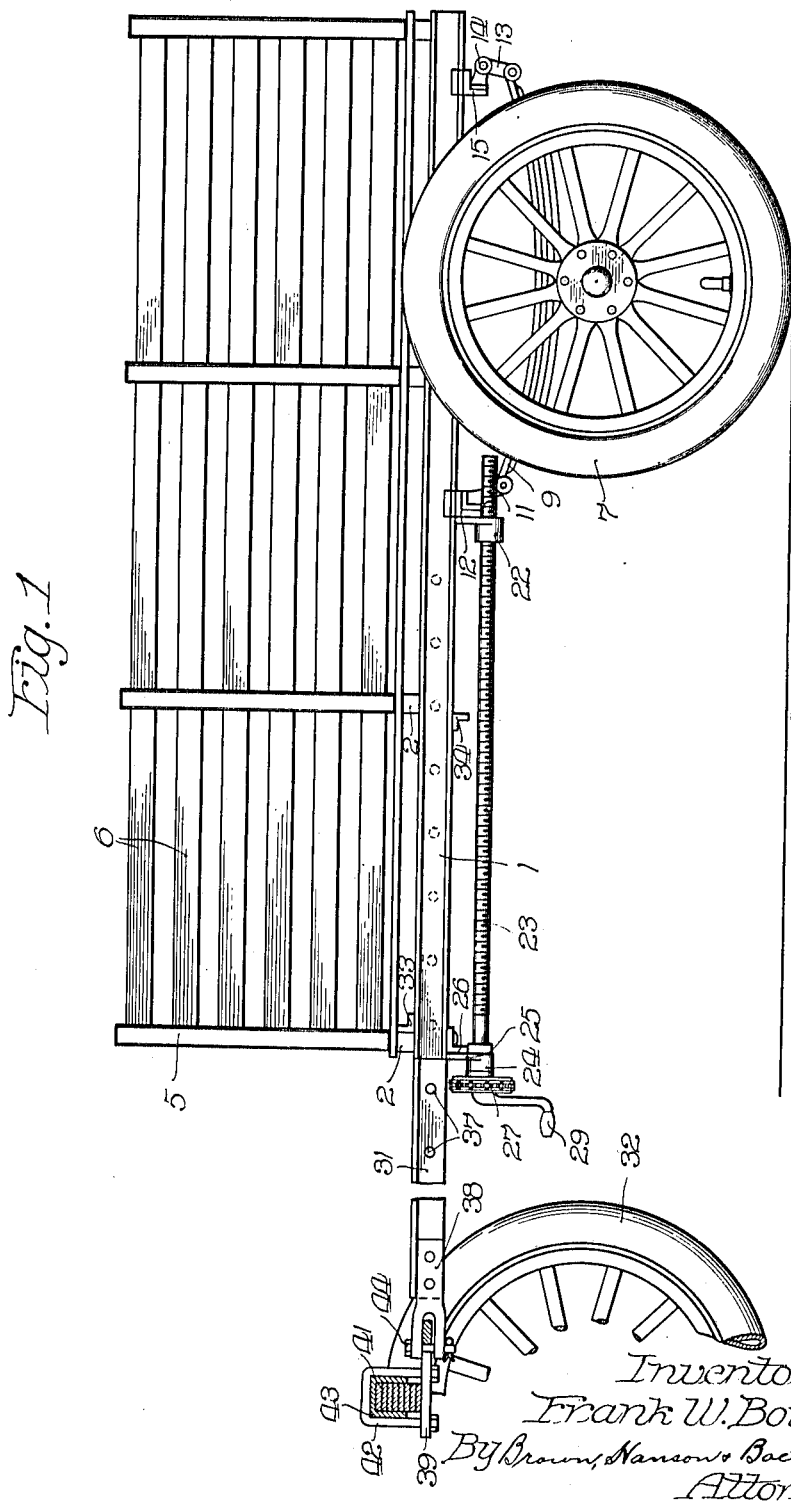

F. W. BOWER.
TRAILER.
APPLICATION FILED FEB. 23, 1918.
1,314,498.
Patented Sept. 2, 1919.
3 SHEETS—SHEET 2.
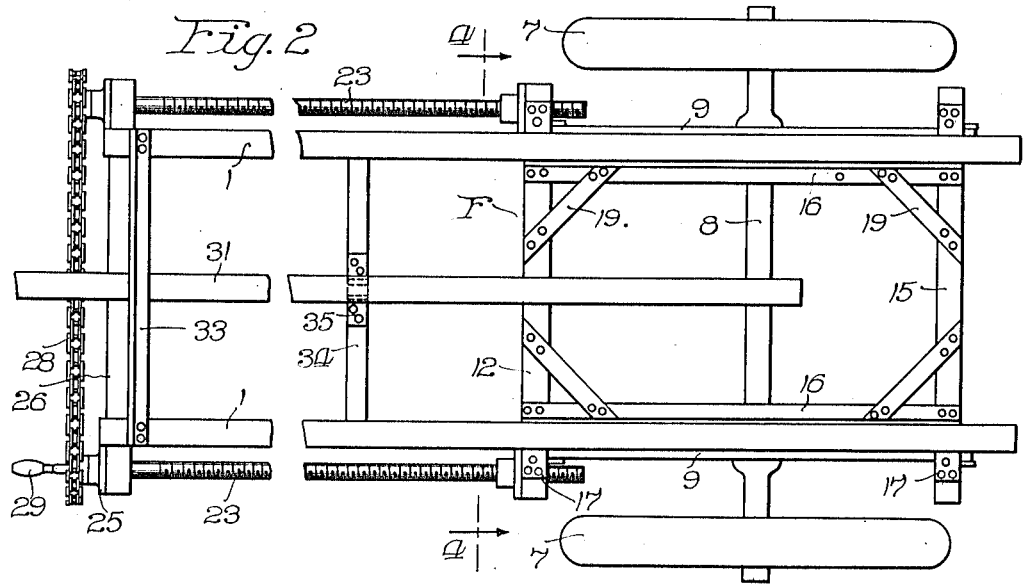
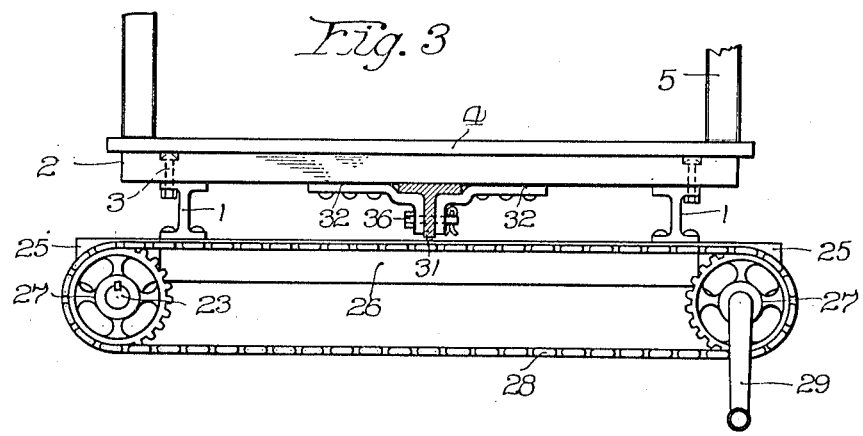
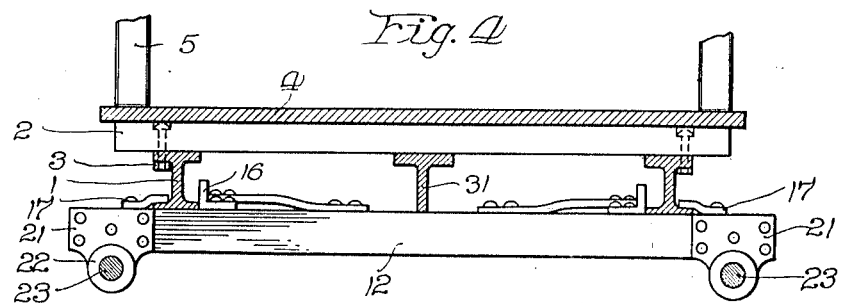
Inventor
Frank W. Bower
By Brown, Hanson & Boettcher
Attorneys F. W. BOWER.
TRAILER.
APPLICATION FILED FEB. 23, 1918.
1,314,498.
Patented Sept. 2, 1919.
3 SHEETS—SHEET 3.
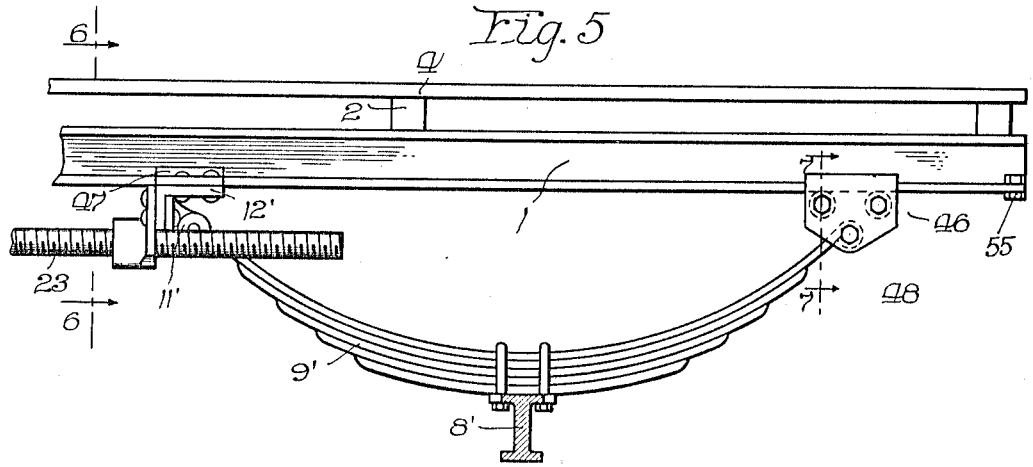
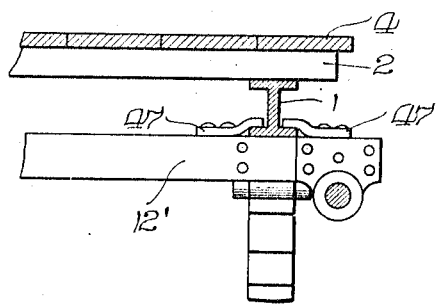
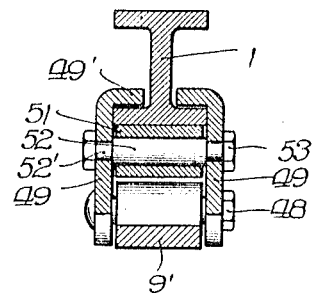
Inventor
Frank W. Bower
By Brown, Hanson & Boettcher
Attorneys

UNITED STATES PATENT OFFICE.

FRANK W. BOWER, OF FOWLER, INDIANA.

TRAILER.

1,314,498.                    Specification of Letters Patent.    Patented Sept. 2, 1919.

Application filed February 23, 1918. Serial No. 218,692.

*To all whom it may concern:*

Be it known that I, FRANK W. BOWER, a citizen of the United States, residing at Fowler, in the county of Benton and State of Indiana, have invented a certain new and useful Improvement in Trailers, of which the following is a full, clear, concise, and exact description, reference being had to the accompanying drawings, forming a part of this specification.

The present invention relates to trailers.

In its broadest aspect the invention consists in a trailer having means for transferring a variable portion of its load to the driving wheels of the pulling vehicle, to secure the desired tractive effort thereby.

To secure the most effective draw bar pull from a pleasure car or truck, its driving wheels should be weighted down or loaded to approximately the capacity intended by the manufacturer. Thus, in a case of a five-passenger touring car, adapted to seat three in the rear of the tonneau, the maximum tractive effort of the car can only be obtained when the driving wheels sustain a load equivalent to three passengers seated in the rear of the machine. Unloaded, the driving wheels would have insufficient tractive engagement and would have considerable difficulty in pulling a heavily loaded trailer.

In the appended detail description illustrating a preferred embodiment of my invention, I have illustrated a two-wheel trailer provided with means for adjustably disposing the two wheels at any desired point beneath the trailer. After loading the trailer, these wheels are shifted to such a point as will bring a determined portion of the trailer load to bear, through the tongue of the trailer, upon the traction wheels of the driving vehicle to secure the most effective tractive engagement thereof.

Heretofore, the practice with two-wheel trailers, which have their wheels secured substantially centrally, has been to place the load on the trailer in certain relation to the wheels so as to locate a certain preponderance of the load forward of the wheels and in this way load the driving wheels of the driving vehicle through the tongue of the trailer. This practice of trying to place the load is often inapplicable with certain types of loads, such as small live stock which will invariably crowd to the rear of the trailer due to its forward motion. My improved trailer can be loaded in any manner and adjustments made thereafter by shifting the wheels.

The average two-wheel trailer, when running at a high speed unloaded, has a tendency to jolt and vibrate the pleasure car or truck. This is avoided by my invention which provides means for shifting the wheels to the rear, thus destroying its balanced condition and putting a considerable portion of the weight of the body of the trailer upon the pulling vehicle.

The means which I preferably employ for shifting the wheels comprises an axle shiftable beneath the trailer body and manually operable worms engaging with said axle and operable to shift the same to any desired point beneath the body of the trailer. A relatively small pitch worm is preferable inasmuch as it is self-locking when once adjusted, but it will be apparent that other mechanisms might be substituted, such as a rack and pinion without departing from the spirit of the invention.

From the broad nature of my invention, it will be apparent that it is of wide utility for all classes of trailer vehicles, to-wit:

Those intended for attachment to pleasure cars for light cartage as of camp outfits, live stock or light loads of any description; those intended for attachment to automobile trucks or tractors for heavy hauling, and those intended for industrial use in factories and yards in single or train attachment to a tractor or locomotive. Other and more specific objects will be apparent from the following invention.

My invention will be understood better from the following detailed specification, taken in connection with the accompanying drawings, in which—

Figure 1 is a side elevational view of my improved trailer, illustrating its mode of attachment to a well known lightweight pleasure car;

Fig. 2 is a plan view of the chassis of the trailer with the body removed;

Fig. 3 is a fragmentary front end view of the trailer;

Fig. 4 is a sectional view taken on the line 4—4 of Fig. 2;

Fig. 5 is a sectional view just within the plane of the trailer wheel, showing a modified form of shiftable axle;

Fig. 6 is a sectional view taken on the line 6—6 of Fig. 5; and

Fig. 7 is an enlarged sectional view taken on the line 7—7 of Fig. 5.

Referring first to Figs. 1 to 4, the frame of the trailer comprises two I-beams 1—1, forming the side sills of the frame, and a plurality of wood crossbeams, 2—2. These crossbeams are bolted to the flanges of the I-beams 1, as shown at 3 in Figs. 3 and 4, and suitably secured to the tops of these crossbeams is the flooring 4.

The trailer may be provided with any style of body. The body illustrated is of open type, comprising the stakes 5 and the spaced siding members 6.

The trailer wheels 7 may be provided with suitable tires of any type desired. These wheels are pivoted on the axle 8, and fastened to the spring pads of the axle are the leaf springs 9. As clearly shown in Fig. 1, the front end of each spring 9 has pivotal connection with a bracket 11, and the rear end of the spring 9 has linked connection through a shackle 13 with a bracket 14.

The two brackets 11 and 14 are riveted or bolted to the front and rear angle bars 12 and 15, respectively, which lie beneath and transversely of the sill beams 1, as shown in Fig. 2. These two angle bars comprise the end members of a frame generally designated F, which is shiftable to and fro beneath the sill beams 1. This frame is completed by two angle bars 16—16 riveted to the end bars 12 and 15. These side bars 16—16 bear against the base flanges of the sill beams 1 and guide the frame in its movement. To prevent the sill beams 1 from jolting upward off the frame F, I have riveted small plates 17—17 to the extending ends of the end bars 12 and 15, these plates abutting the sill-beams 1 and having lugs projecting over and confining the base flanges of the sill beams. Reinforcing straps 19—19 extend diagonally across the corners of the frame F and are riveted to the side and end bars.

The laterally extending ends of the front angle bar 12 have riveted thereto plates 21—21 (Fig. 4) which have formed integral therewith bosses 22 threaded for the reception of the worms 23—23. The worms 23 extend forward parallel to the sill-beams 1, and are journaled in plain bearings 24. These plain bearings 24 are similar to the nut-bearings 22, having plates 25 riveted to the extending ends of the transverse angle bar 26. This transverse angle bar is riveted to the ends of the sill-beams 1, as shown in Fig. 1.

The worms 23 extend through the bearings 24 and are keyed or otherwise rigidly fastened to sprockets 27—27. A chain 28 is trained over these sprockets (Fig. 3) and a crank handle 29 is rigidly connected to one of the sprockets.

The operation of shifting the trailer wheels will be apparent from the foregoing description. Rotation of the crank handle 29 simultaneously rotates both worms 23 and slides the frame F either forward or backward. This operation of shifting the wheels can be accomplished even with the trailer heavily loaded, due to the mechanical advantage afforded by the worms 23.

It is within the scope of my invention, however, to interpose anti-friction devices between the frame F and the sill-beams, in order to take the strain off of the worms. This may be accomplished in any well known manner.

For transporting small live stock, I find it advisable to shift the wheels to substantially the position illustrated, or even slightly to the rear thereof. The stock, when crowded in the rear of the trailer, will thus impose a load upon the rear wheels 32 of the pulling vehicle through the tongue 31 of the trailer.

The tongue 31 comprises a T-bar centrally disposed between the sill-beams 1, and arranged for extensible movement in and out of the trailer chassis. Referring to Fig. 3, a pair of guide plates 32—32 extend down and embrace the flanges and web of the T-bar. These guiding plates are riveted to a transverse angle bar 33, directly behind the wood cross beam 2; the angle bar 33 is riveted to the sill-beams 1 and bears upon the end of the tongue. A similar angle bar 34 is riveted farther back on the under side of the sill-beams 1. This latter angle bar receives the downward pressure of the inner end of the tongue 31, and has small guiding lugs 35 (Fig. 2) which embrace and guide the web of the tongue. The vertical extensions of the guide plates 32 are apertured for the passage of a bolt or the like 36. To adjust the effective length of the tongue 31, the same is moved either in or out of the trailer until the desired opening 37 in the web of the tongue registers with the apertures in the guide plates 32, when the bolt 36 can be inserted through the opening and retained therein by a cotter pin or the like. There are a plurality of these openings 37 along the length of the tongue to adapt the same to different extensions.

The extensible tongue feature is advantageous in the hauling of long pieces of lumber or the like as it enables the trailer to be placed quite a distance behind the automobile or truck.

A forked member 38 is bolted to the end of the tongue 31, and engaging in the forked portion thereof is a clevis 39. Where the trailer is intended for regular attachment to a Ford automobile the clevis 39 is permanently bolted to the rear spring 41 by the spring clips 42, which extend down through holes in the limbs of the clevis.

The spring 41 extends up into the channel 43 of the frame and the clips 42 engage over the outside of the channel 43. A bolt 44 passes through the forked arms of the member 38 and affords a releasable connection between the clevis 39 and the tongue of the trailer.

The foregoing is merely illustrative of a simple and effective manner of hitching the trailer to a Ford automobile. Different connections might be required with different makes of cars. It is of decided advantage, however, in attaching the trailer to spring vehicles, that the tongue of the trailer be connected with some part of the frame or body of the vehicle rather than to the axle of the same. The jolting and vibration of the trailer is thus absorbed by the springs of the pulling vehicle.

In the modified form illustrated in Fig. 5, I dispense with the frame F by the provision of a rolling shackle 46. As in the preceding construction, the worms 23 operate to shift the transverse angle bar 12′. The horizontal limb of the angle bar 12′ is made longer than in the preceding form, to prevent tilting of the same relative to the sill beams 1. Guide plates 47—47 are riveted to the angle bar 12′ upon opposite sides of each sill-beam 1. The margins of these plates extend up and lie over the base flanges of each sill-beam. A suitable bracket 11′ is riveted or bolted to the angle bar 12′ for pivotal connection with the front end of each leaf spring 9′. The rear end of the leaf spring 9′ encircles a bolt 48 in the rolling shackle 46.

As shown in section in Fig. 7, this shackle comprises the two side plates 49—49 and the two rollers 51—51. The side plates 49 have inturned flanges 49′ embracing the base flanges of the sill-beams. The rollers 51 are mounted on pivot bolts 52, having reduced threaded ends 52′ extending through openings in the side plates 49. Nuts 53 thread over these reduced ends and clamp the side plates against the shoulders formed by the enlarged central portion of the bolt 52. The roller 51 is slightly narrower than this central portion and thus there is no tendency to bind or squeeze the roller.

This rolling shackle will move in accordance with the movements of the angle bar 12′ with very little friction. The operation of shifting the axle 8′ is precisely the same as described with the preceding form. Any suitable abutment means 55 may be secured to the rear ends of the sill-beams 1, to prevent the rolling shackle from being accidentally pushed off the end of the beam.

It will be apparent that by transferring a portion of the trailer load to the driving wheels of the automobile the capacity of the trailer may be increased in addition to increasing the traction of the automobile. The automobile and trailer may be considered as a six-wheel vehicle, having means for so proportioning the loads between the wheels as to obtain maximum traction and carrying capacity.

My improved trailer is susceptible of extensive modification by one skilled in the art, but I consider these modifications as not departing from the spirit and scope of the invention.

I claim:

1. In combination, a trailer frame, a member guided for movement along said frame, a spring connected at one end to said member, a shackle member adapted for rolling motion along said trailer frame, the other end of said spring being connected to said shackle, and means for shifting said first member along said trailer frame.

2. In combination, a trailer frame comprising longitudinal sill beams, a transverse bar guided for movement along said sill beams, a pair of shackle members having rollers engaging with said sill beams and adapted for rolling motion therealong, a pair of leaf springs having their ends connected to said transverse bar and to said rolling shackles, trailer wheels connected to said leaf springs, and means for shifting said transverse bar along said trailer frame.

3. In a trailer, a body structure, a supporting spring, a cross bar movable along the body structure, one end of said spring carried by said cross bar, means for connecting the other end of said spring to said body structure, said means adapted for sliding motion on the body structure.

4. In a trailer, a main frame, a supporting spring, a secondary frame movable along the main frame, one end of said spring secured to said secondary frame, means for connecting the other end of said spring to the main frame, said means adapted for sliding motion along the main frame, and anti-friction means between said main frame and spring connecting means.

5. In a trailer, a main frame, a supporting spring, a sub-frame movable on the main frame, one end of said spring secured to said sub-frame, a shackle member connecting the other end of said spring with said main frame, said shackle member having a roller member between said main frame and said shackle and being adapted for rolling motion along said main frame.

In witness whereof I hereunto subscribe my name this 18th day of February, A. D. 1918.

FRANK W. BOWER.